United States Patent [19]

King et al.

[11] Patent Number: 4,863,099

[45] Date of Patent: Sep. 5, 1989

[54] THERMODYNAMIC ELECTRONIC ACTUATOR FOR BUILDING HEATING/AIR CONDITIONING SYSTEM

[75] Inventors: Waldon O. King, 600 Luttie Rd., Watson Riverside, Myrtle Beach; Michael E. McShane, 8800 Kings Rd., Myrtle Beach, both of S.C. 29577

[73] Assignees: Waldon O. King; Michael E. McShane, both of Myrtle Beach; Richard T. Donovan, Garden City, all of S.C.

[21] Appl. No.: 216,029

[22] Filed: Jul. 7, 1988

[51] Int. Cl.$^4$ .......................................... G05D 23/00
[52] U.S. Cl. .................................. 236/46 R; 62/158; 236/47
[58] Field of Search ................. 236/1 R, 47, 46 R, 51; 165/11 R; 340/545; 62/158

[56] References Cited

U.S. PATENT DOCUMENTS

| | | | |
|---|---|---|---|
| 3,729,735 | 4/1973 | Dageford | 236/1 R X |
| 4,035,796 | 7/1977 | Hedly et al. | 236/94 X |
| 4,508,740 | 11/1977 | Dalton et al. | 340/545 X |
| 4,784,319 | 11/1988 | Kaiser | 236/46 R |

FOREIGN PATENT DOCUMENTS 2019046 10/1979 United Kingdom ............... 236/1 R

Primary Examiner—William E. Wayner
Attorney, Agent, or Firm—Martha G. Pugh

[57] ABSTRACT

This relates to a thermodynamic electronic actuator for intermittently controlling the operation of a heating and/or air conditioning system for any temperature controlled area when a door or window is left open or ajar. The actuator circuit comprises a normally-closed switch (or switches if used for more than one opening), which initiates operation of a count-up timer to interrupt the thermostat line after a predetermined period whenever a door or window is left open. To restore power, all that is required is to shut the window or door. This actuates a count-down timer that will restore the thermostat line after a predetermined period, assuming the window or door is not reopened, interrupting the countdown.

6 Claims, 2 Drawing Sheets

THERMODYNAMIC ELECTRONIC ACTUATOR FOR BUILDING HEATING/AIR CONDITIONING SYSTEM

BACKGROUND OF THE INVENTION

This relates in general to a system for shutting down operation of a building temperature control system, such as heating or air conditioning, when an outside door is left open.

Energy loss may occur in a temperature-controlled residence or place of business when an outside door is left open or ajar, accidentally or intentionally. This causes decrease in the efficiency of the system by overworking, and causes wear and tear on its parts.

It is therefore the principal object of this invention to increase the efficiency of a building temperature control sytsem.

It is a more particular object of the invention to increase the efficiency and comfort level of a home thermostatically-controlled heating or air conditioning by decreasing the overworking of the system due to an outside door being accidentally or intentionally left open or ajar.

SHORT DESCRIPTION OF THE INVENTION

In accordance with the present invention, these and other objects are achieved in a thermostatically-controlled heating or air conditioning system, hereinafter called a comfort system, for a home or other enclosed space, by installation of a thermodynamic electronic actuator which includes a normally-closed switch which is automatically actuated whenever an outside door is opened, to shut down power to the comfort system.

With all outside doors closed and the comfort system in normal operation, the thermodynamic electronic actuator unit of the present invention is in a quiescent state or idle condition, even though power is on to drive the unit.

If power is on to the actuator unit and an outside door is opened, operation of the actuator unit is initiated, by opening the normally-closed switch which is physically located in the door jamb.

Opening of the door switch causes a count-up timer to begin counting up, holding all operations to normal for a preselected period $P_1$. If the door is closed before the count-up is completed all operations will remain normal, permitting the system to reset. If the door remains open, the count-up timer will continue to count to the end of the period $P_1$, at which time a relay is energized, causing the normally-closed contacts to the thermostat line to open, and the comfort system to shut down. As long as a door is open, the count-up timer remains on, and the comfort system will not operate. As soon as the door is closed, and assuming it remains closed, a count-down timer proceeds to count through a period P, at the end of which period, operation of the comfort system is reestablished.

This system has the advantage of saving energy and wear and tear on the parts of an air conditioning or heating system for an enclosed space, such as a home or building. Further, it saves the occupants from the annoyance of continuously closing doors which have been left open.

These and other objects will be better understood by a study of the specification hereinafter with reference to the attached drawings.

SHORT DESCRIPTION OF THE DRAWINGS

DETAILED DESCRIPTION OF THE INVENTION

Figure 1:
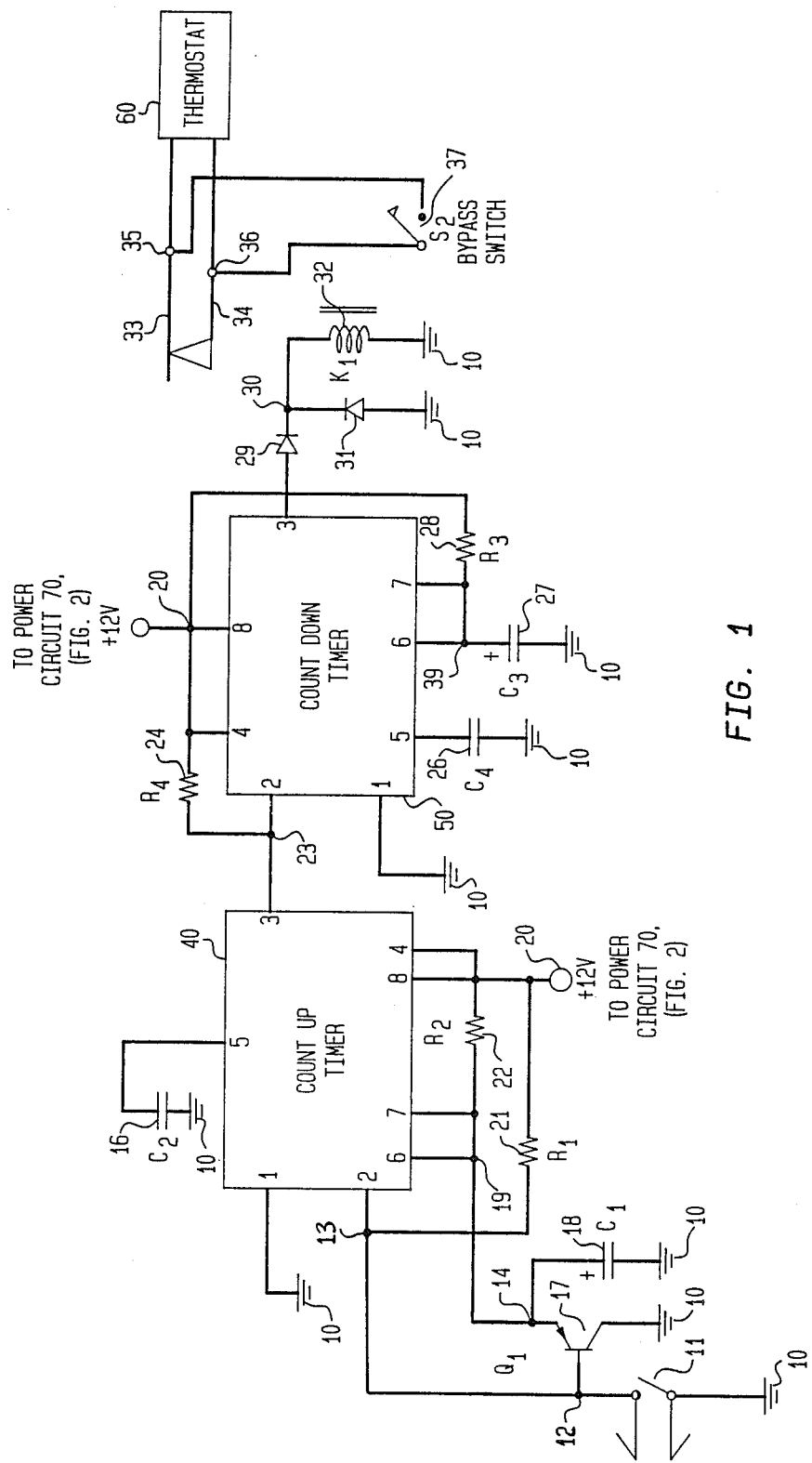
FIG. 1 is a circuit schematic of the thermodynamic electronic actuator unit of the present invention with the exception of the power supply system.

Referring to FIG. 1, which shows the primary circuit schematic of the thermodynamic electronic actuator unit of the present invention, a conventional, normally-closed switch 11 is mounted in the door jamb of a normally-closed door to a room, or other enclosure, of which the temperature is normally-controlled to a desired comfort level by means of a conventional thermostat 60 which controls the level of power to a conventional internal heating or air conditioning system, called a "comfort system". The switch 11 is of a type sold as a contactor for a "push-to-close wok circuit, and is manufactured by Edwards Company, Inc., Norwalk Conn. 06856, a unit of General Signal, Inc., Catalogue No. 44.

The switch 11, which is normally closed when the door is closed, is electrically connected through the circuit of p-n-p transistor 17 to the count-up timer 40.

The count-up timer 40 and count-down timer 50 are each of a type manufactured by North American Phillips, located at Walton, Mass. 02254, and described in detail in their Catalogue #ECG212P, dated Oct. 1987, under parts Number I.C. 1, C1555C. They each have connecting pins 1–8, which are connected to the internal circuitry as indicated in the above-numbered Catalogue. In the present embodiment, the count-up timer 40 is constructed to count for a period of one minute and forty five seconds, and the count-down timer 50, for a period of two minutes.

Switch 11 is connected between ground contact 10 and junction 12, which is connected through the junction 13 to the pin 2 of the count-up timer 40. Junction 12 is also connected to the base of a conventional p-n-p transistor 17, the collector of which is connected to ground 10. The base contact of transistor 17 is also connected to the junction 14, which is connected to ground 10 through the 100 microfarad (25 volt) capacitor 18.

The emitter contact at junction 14 is connected through junction 19 to the input pins 6 and 7 of timer circuit 40. Junction 19 is connected through the 1.2 megohm resistor to the junction between the pins 8 and 4 of count-up timer 40, and the 12 volt positive DC terminal 20 of the power circuit 70, which will be described hereinafter with reference to FIG. 2. Junction 13 leading to pin 2 of count-up timer 40 is connected through the 5.6K ohm resistor 21, also to the positive 12 volt DC terminal 20 of power circuit 50. Pin 5 of the count-up timer 40 is connected to ground 10 through the 0.01 microfarad, 16–20 volt capacitor 16; and pin 1 of the count-up timer 40 is connected directly to ground 10. The output pin 3 of count-up timer 40 is connected through the junction 23 to pin 2 of the count-down timer 50.

The junction 23 is connected through the 10K ohm resistor 24 to the junction between pins 4 and 8 of the count-down timer 50, which are connected to the 12 volt DC terminal 20 of power circuit 70, to be described hereinafter. The latter junction is also connected through the 1.2 megohm resistor 28, to the junction 39 of pins 6 and 7 of count-down timer 50, which is connected through the 100 microfarad (25 volt) capacitor 27 to ground 10. Pin 5 of count-down timer 50 is connected through the 0.01 microfarad (50 volt) capacitor 26 to ground 10; and terminal 1 is connected directly to ground 10.

The output terminal 3 of count-down timer 50 is connected through the diode 29 to juntion 30, which is connected to ground 10 through the diode 31, across the coil of the iron-cored disable relay 32. The latter is constructed, when energized, to actuate the normally-closed contact 34 leading to junction 36, to break with contact 33, leading to junction 35. Junctions 35 and 36 lead to the enabling circuit of the thermostat 60 which controls the heating and/or air conditioning comfort system. A by-pass circuit is connected between the junctions 35 and 36 through the by-pass switch 37 which may be installed to by-pass the shutdown unit during maintenance of the air conditioning or heating systems.

Figure 2:
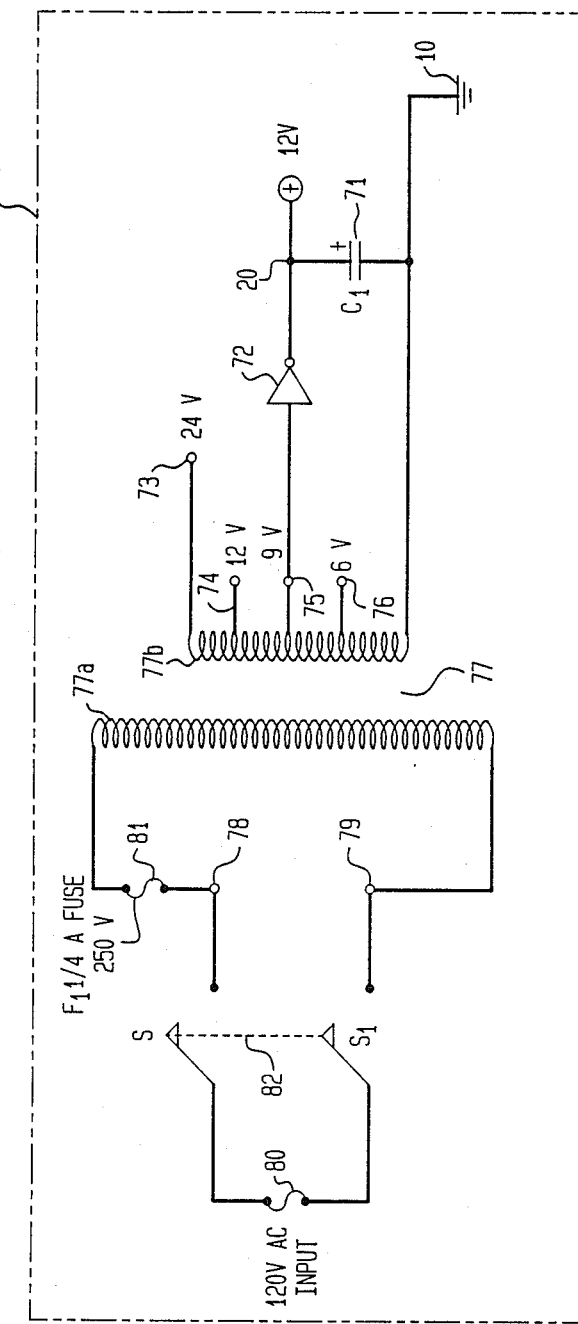
FIG. 2 shows a typical power supply system to be used in connection with the actuator unit shown in FIG. 1.

Referring to FIG. 2, which shows the schematic of the power supply circuit 70, the latter is connected through a conventional double-pole single-throw switch 82 to a 120 volt 60 cycle AC source 80, which is connected across the terminals 77 and 78 of the primary coil 77a of the step-down transformer 77. A 250 volt fuse 81 is interposed in the line between 78 and 77a.

The secondary coil 77b may have a plurality of taps for convenience, including, for example, a high voltage tap 73, providing 24 volts AC, a second tap 74 providing 12 volts AC, a third tap 75 providing 9 volts AC, and a fourth tap 76 providing 6 volts AC, the low voltage terminal being connected to ground 10.

In the embodiment under description, connection is made to contact 75, which connects 9 volts AC through the silicon rectifier 72 to the 12 volts DC terminal 20, across which the 4700 microfarad capacitor 71 is connected to ground 10 at the ground terminal of secondary coil 77b.

It will be understood that the ground contacts 10 in the circuits of FIGS. 1 and 2, are not connected to the chassis, but to the power supply common at the negative side of capacitor 71.

Operation

Assuming the central heating or air conditioning system (comfort system) is in operation under control of the conventional thermostat system 60, the thermodynamic electronic actuator unit of the present invention operates as follows:

(a) With all outside doors closed and the heating/air conditioning system (comfort system) in normal operation, the actuator unit of the present invention is in a quiescent state, even though the power system 70 to the unit is connected through the switch 82 to AC power source 80.

(b) When the door is opened in which the door jamb switch 11 is mounted, operation of the actuator unit is initiated by disconnecting the ground 10 from the pin 2 of count-up timer 40, and also from the base of transistor 17. This causes capacitor 18 to discharge, applying a pulse to the count-up timer 40, which initiates its counting-up operation, holding all operations normal for a period $P_1$, which, in the present embodiment, is one minute and forty-five seconds. If the door is closed again during this interval, before the count is complete, the switch 11 is reclosed, and the capacitor 18 recharges, resetting the system; and all operations remain normal.

If the door is not closed during the count-up interval, the count-up timer 40 will actuate, applying an output signal through junction 23 to the count-down timer 50, causing the count-down timer 50 to energize the disabling relay 32.

(c) Operation of disabling relay 32 breaks contact between 33 and 34, cutting off power to the thermostatic control circuit 40, causing operation of the heating and/or air conditioning system (comfort system) to shut down.

(d) As long as the door remains open, both count-up timer 40 and count-down timer 50 remain in operation, keeping relay 32 operated, and the power to thermostatic control circuit 60 cut off. Thus, the heating/air conditioning system (comfort system) will not operate.

(e) When the door-operated switch 11 has been closed, ground is reapplied to the base of transistor 17, and pin 2 of the count-up timer 40, causing the count-up timer 40 to reset, and the dount-down timer 50 to start its count-down, which counts down for a period of $P_2$ which in the present embodiment is two minutes. If the switch 11 remains closed during the period $P_2$, the count-down timer 50 will turn itself off at the end of the period.

(f) When count-down timer 50 turns off, relay 32 is deenergized, allowing the normally-closed contacts 33 and 34 to the thermostatic control system 60 to reclose, completing its power line, and returning operation of the heating/air conditioning system (comfort system) to normal, provided the switch 11 is not reopened during the interval.

(g) It will be understood that the actuator unit is applicable to an enclosure having a number of doors, each of which includes a switch mounted in the door jamb, similar to the switch 11 in FIG. 1, the switches all being connected in series between ground 10 and the junction 12, so that if any one of them is open, ground is disconnected from the junction 12 to the base of transistor 17, and pin 2 of count-up timer 40, initiating operation of the actuator unit of the present invention.

The present actuator unit has numerous advantages, not the least of which is the tremendous cost reduction for energy used for heating and/or air conditioning, which, when applied on a large scale, may even reduce the total cost per kilowatt hour for an entire community. Another advantage is that wear and tear on heating and air conditioning equipment may be saved by preventing its overuse.

The invention is not limited to the specific components or circuit arrangements disclosed herein by way of example, but only by the scope of the appended claims.

What we claim is:

1. For use in combination with a comfort system including thermostatic control means for maintaining thermostatic control of a heating and/or air conditioning system (comfort system) in a building or other enclosed space, a thermodynamic electronic actuator unit comprising in combination:

a door switch which is actuated to open or close by the opening or closing of a door to said enclosed space;

a timer circuit connected in electrical circuit relation to said switch comprising an electronic count-up timer, operation of which is initiated by operation of said door switch to count up through a preselected period $P_1$, as long as said door remains open;

relay means electrically coupled to receive an output signal from said timer circuit and to be energized by said output signal at the end of said preselected counting period $P_1$; and means comprising a pair of contacts interposed in the operation circuit of thermostatic control means for said heating and/or air conditioning means (comfort system), to be actuated by energization of said relay means to turn off operation of said thermostatic control means; and automatic reset means for automatically restoring operation of said heating and/or air conditioning system (comfort system) after said door is closed.

2. For use in combination with a comfort system including thermostatic control means for maintaining thermostatic control of a heating and/or air conditioning system (comfort system) in a building or other enclosed space, a thermodynamic electronic actuator unit comprising in combination:

a door switch which is actuated to open or close by the opening or closing of a door to said enclosed space;

a timer circuit connected in energy transfer relation to said switch comprising an electronic count-up timer, operation of which is initiated by operation of said door switch to count up through a preselected period $P_1$, as long as said door remains open;

relay means electrically coupled to receive an output signal from said timer circuit and to be energized by said output signal at the end of said preselected counting period $P_1$;

means comprising a pair of contacts interposed in the operation circuit of thermostatic control means for said heating and/or air conditioning means (comfort system), to be actuated by energization of said relay means to turn off operation ofsaid thermmostatic control means;

wherein said timer circuit includes a count-down timer in circuit relation with said count-up timer and said relay means;

said count-down timer constructed to receive a signal from said count-up timer which is initiated by said door switch when said door is closed, and to thereby initiate a count-down operation, in the absence of the door reopening, continues for a period of $P_2$, at the end of which period said relay means is deenergized, and the contacts interposed in the operating circuit of said thermostatic control means are deactuated, permitting operation of said thermostatic control means to again turn on.

3. A thermodynamic electronic actuator unit in accordance with claim 2 wherein said door switch comprises a normally-closed electromechanical switch interposed in the door jamb of at least one door to said enclosed space, which door switch is opened and remains open while said door is open, said door switch being in circuit relation with said count-up timer circuit to initiate operation of said count-up timer circuit when said door is opened, and in circuit relation with said count-down timer circuit to initiate operation of said count-down timer circuit when said door is closed.

4. A thermodynamic electronic actuator unit in accordance with claim 3 which comprises a plurality of normally-closed electromechanical switches each interposed into the door jamb of a different door and constructed to open when each said door is opened, the door switches of said plurality arranged in circuit relation with said timer circuit whereby when any one of said door switches is opened, operation of said count-up counter is initiated, and wherein when all of said door switches are closed operation of said count-down counter is initiated.

5. A thermodynamic electronic actuator unit in accordance with claim 3 wherein the count-up period $P_1$ of said count-up timer approximates one minute and forty-five seconds, and wherein the count-down period $P_2$, of said count-down timer approximates two minutes.

6. The thermodynamic electronic actuator unit of claim 3 wherein said normally-closed door switch is connected to said timer circuit through an initiating circuit for initiating operation of said count-up timer circuit, wherein said initiating circuit includes a transistor having at least an emitter, a grounded collector and a base electrode connected to ground through said normally-closed door switch;

a capacitor connected between said emitter and ground, and the junction between said capacitor and said emitter connected to said base electrode and to input terminals of said timer circuit, whereby when said normally-closed door switch is opened, said capacitor discharges through said transistor, imposing a pulse on the input terminals of said count-up timer circuit.

* * * * *